Inventor
RONALD RIMMER

United States Patent Office 3,273,338
Patented Sept. 20, 1966

3,273,338
JET ENGINE SHOCK WAVE CONTROL SYSTEM INCLUDING FUEL SUPPLY AND EXHAUST NOZZLE REGULATION
Ronald Rimmer, Bristol, England, assignor to Bristol Siddeley Engines Limited, Bristol, England, a British company
Filed Feb. 13, 1964, Ser. No. 344,722
Claims priority, application Great Britain, Feb. 19, 1963, 6,680/63
6 Claims. (Cl. 60—35.6)

This invention relates to control systems for fluid-fuelled engines for aircraft for flight at supersonic speeds, of the kind operating with subsonic airflow speeds in the combustion zone and having an exhaust nozzle the throat area of which is adjustable. The engines may be ramjet engines, or may be turbojet engines with a variable-geometry supersonic air intake.

During operation a normal shock wave occurs where the velocity of the intake air relatively to the engine changes from a supersonic to a subsonic value. For efficient operation of the intake diffuser it is necessary that the position of the normal shock wave should remain fixed within narrow limits, a situation described as operation at critical pressure recovery, and this entails controlling the pressures within the engine, upon which the position of the normal shock wave depends. The pressure control can be effected in various ways, more particularly by varying one or more of the following factors: intake throat area, exhaust nozzle throat area, fuel flow; or by discharging part of the intake air from upstream of the combustion zone. It is also in practice nencessary to provide for maintaining the thrust at a selected value, and for varying this value, which again may be done by varying one or more of the above-mentioned factors. It is possible to vary two of the factors at once in a coordinated manner, so as to vary the thrust while maintaining critical pressure recovery.

One convenient procedure is to regulate fluel flow to produce the required engine thrust and to regulate the exhaust nozzle area to maintain intake operation at critical pressure recovery.

If the converse procedure is used, so that fuel flow is regulated to maintain intake operation at critical pressure recovery, and exhaust nozzle area is regulated to produce the required engine thrust, the response requirements of the nozzle adjusting system become less stringent, and this procedure is therefore preferred.

In each case, additional control is necessary to prevent transgression of the limits of fuel-and-air mixture combustibility.

According to the present invention, in a system operating according to the converse procedure mentioned above, the additional control is exercised by a system sensing the fuel:air ratio and acting upon the exhaust nozzle adjusting system to maintain the fuel:air ratio constant at a value selected according to the required thrust.

More particularly, the control system according to the invention comprises:

(a) Fuel flow control means responsive to the position of a normal shock wave in the air intake so as to tend to return the shock wave to a predetermined position on departure therefrom,
(b) Means for producing a first signal which is a function of the supply of fuel to the engine,
(c) means for producing a second signal which is a function of the mass flow of air through the engine,
(d) Exhaust nozzle throat area varying means responsive to the ratio of the first and second signals to reduce nozzle throat area on increase of said ratio from a predetermined value, and vice versa, and
(e) Means constituting a thrust selector for modifying one or both of the said signals, or the response of the nozzle throat area varying means to their ratio.

The thrust selector may be operated by a device responsive to flight Mach number so as to keep the flight Mach number constant, or may be "schedule" in response to flight Mach number and altitude, so that the flight Mach number varies with altitude according to a predetermined flight plan.

The accompanying drawings show embodiments of the invention diagrammatically and by way of example. In the drawings.

Figure 1:
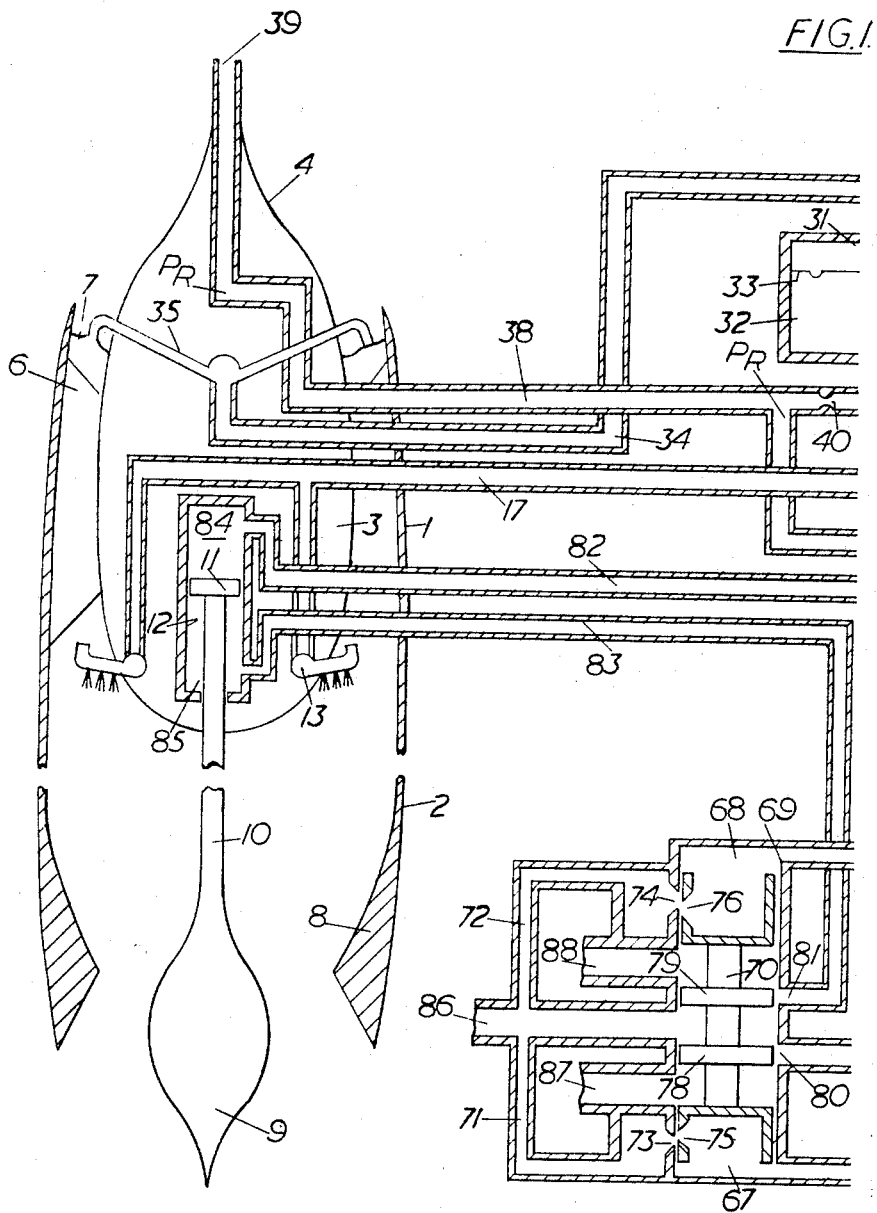
FIGURE 1 shows one form of control system in association with a ramjet engine.
Figure 1:
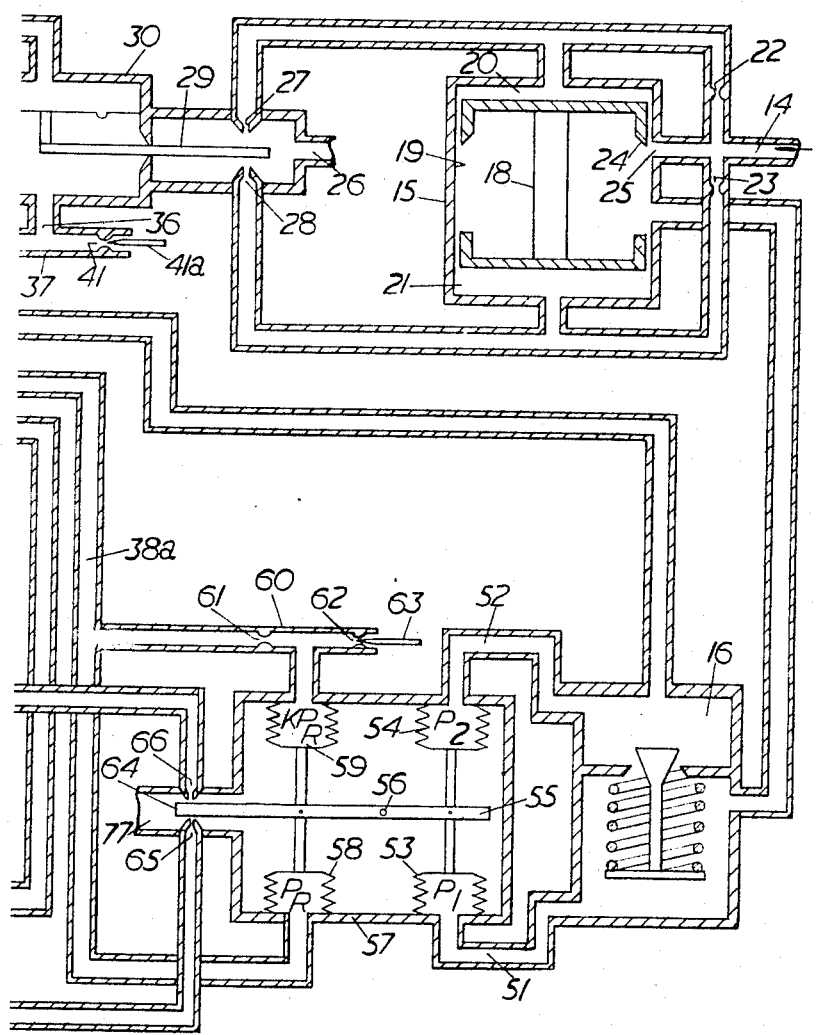

In FIGURE 1, front and rear end parts of the casing of a ramjet engine are shown at 1 and 2, a centre section including flame holding devices being omitted. A centre body 3 with a conical forward end 4 constituting a compression surface is supported by struts 5 in the front end 4 of the casing and defines with the casing an air intake passage 6. During flight at low supersonic speeds the engine may be operated with the normal shock wave at the lip of the casing 1, this position giving best intake efficiency, but at higher speeds it is desirable for the normal shock wave to be a short distance within the intake passage, as shown at 7, so as to allow for some displacement upstream without the shock wave leaving the passage, which might result in so-called "buzz" and damage to the engine. The part of the passage downstream of the normal shock wave serves as a subsonic diffuser. The rear end part 2 of the casing carires a convergent-divergent nozzle 8 through which the products of combustion are exhausted. A streamline shaped plug 9 is provided for varying the throat area of the nozzle and is carried on a rod 10 extending rearwardly from a piston 11 reciprocating in a cylinder 12 housed in the centre body 3. The centre body also supports a number of fuel jet pipes 13, the fuel being burnt in a centre section of the casing as already mentioned.

Fuel is pumped from a tank, not shown, to the injectors 13 by way of a pipe 14, a servo-operated throttle valve 15, a valve 16 having a linear pressure-flow characteristic, and a pipe 17.

The throttle valve 15 comprises a double-ended piston 18 operating in a cylinder 19 so that servo pressure chambers 20 and 21 are formed at its ends. These are supplied from the inlet pipe through small orifices 22 and 23 and the piston has a skirt portion 24 which variably closes an inlet port 25 as the piston moves in response to an increase of pressure in the chamber 20 over that in the chamber 21. The chambers 20 and 21 are vented to a fuel spill pipe 26 through nozzles 27 and 28 on opposite sides of a flapper valve 29 which projects through a flexible fulcrum member into a casing 30 divided into two chambers 31 and 32 by a diaphragm 33 to which the flapper valve is attached. The chamber 31 is connected by a pipe 34 to a reversed Pitot system 35 sensing pressure in the intake pasage at the desired location of the normal shock wave 7, while the other chamber 32 is connected to a tapping point 36 in a pressure potentiometer 37 receiving air through a pipe 38 from an impact pressure sensing head 39 mounted at the nose of the centre body 4. A static pressure sensing head in a position clear of boundary layers adjacent the walls of the passage 6 may be used instead of the reversed Pitot system 35.

The pressure potentiometer comprises a fixed area restrictor 40 upstream of the tapping point 36 and a variable area restrictor 41 downstream of the tapping point. During normal flight there is a sufficient drop of pressure across the downstream restrictor 41 for sonic flow velocity to be reached in it (i.e., it operates in the choked condition) so that the pressure in the chamber 32 is independent of atmospheric pressure, into which the pressure potentiometer discharges, and is a fixed proportion of the impact pressure $P_R$ sensed by the head 39 dependent only on the ratio of the areas of the two restrictors. The downstream adjuster 41a of the restrictor 41 is set so that the pressures in the chambers 31 and 32 on opposite sides of the diaphragm 33 are equal during normal operation with the normal shock wave located at 7, i.e., in the region of the sensing orifices of the reversed Pitot system 35. If it is desired, at lower flight speeds, to operate with the normal shock wave at or nearer to the lip of the casing 1, as previously mentioned, this may be arranged by changing the setting of the adjuster 41a. The adjuster may for example be moved through a cam follower 90 cooperating with a suitably shaped cam 91 rotated by a Machmeter 92.

This part of the system operates as follows: should the pressure inside the ramjet engine casing increase, without a corresponding increase in pressure recovery in the air intake, the normal shock wave moves forward and the reversed Pitot system senses a higher pressure behind it. The pressure in the chamber 31 consequently rises above that in the chamber 32, and the diaphragm 33 moves the flapper valve 29 to increase the obstruction of the nozzle 27 and reduce that of the nozzle 28. The throttle valve piston 18 accordingly moves downwards, as seen in the drawing, reducing the area of the inlet port 25 and therefore reducing the flow of fuel to the combustion system of the engine. The pressure of the air in the combustion system accordingly falls until balance is restored, with the normal shock wave at the desired position 7.

The position of the exhaust nozzle throat area control plug is controlled in the following manner. The pressures $P_1$ upstream and $P_2$ downstream of the linear flow valve 16, the difference between which is of course proportional to the flow of fuel, are conveyed through passages 51 and 52 to capsules 53 and 54 respectively, acting in opposition upon one arm of a balance beam 55 which is pivoted at 56 in a casing 57. The other arm of the balance beam is acted upon by two capsules 58 and 59 in opposition. The impact pressure $P_R$ sensed by the head 39 is conveyed by a pipe 38a to the capsule 58, while the capsule 59 receives a proportional part of this pressure $KP_R$, which is tapped from a pressure potentiometer 60 leading from the pipe 38a to atmosphere and having a fixed-area upstream restrictor 61 and a downstream restrictor 62 the area of which is adjustable by means of a needle 63. The two capsules thus apply a net force which is proportional to $(1-K)P_R$, i.e., directly proportional to $P_R$, with a proportionality which is adjustable by adjusting the needle 63 and thereby altering K. Alternatively one could apply the pressure $KP_R$ in the capsule 58 replace the capsule 59 by an evacuated capsule having an effective area equal to that of the capsule 58. Both these alternatives eliminate the effect of pressure in the casing 57. With the second alternative the net force would be directly proportional to $KP_R$. The balance beam 55 also carries a flapper valve 64 operating between venting nozzles 65 and 66 connected to end servo chambers 67 and 68 of a cylinder 69 containing a piston valve 70. Servo oil pressure is supplied to the end chambers through passages 71 and 72 and ports 73 and 74 in the wall of the cylinder 69 which are controlled by ports 75 and 76 in skirt portions of the piston valve so as to obtain a feed-back action as the piston valve is displaced. After passing through the venting nozzles 65 and 66 the oil returns to the low pressure side of the supply system through a passage 77. The piston valve 70 has two lands 78 and 79 which, in a neutral position of the valve, close ports 80 and 81 connected by passages 82 and 83 to the two end chambers 84 and 85 of the exhaust nozzle plug operating cylinder 12. The valve cylinder 69 also has a central servo oil supply port 86 opening between the lands 78 and 79, and two end return flow ports 87 and 88.

In operation, the impact pressure $P_R$ sensed by the head 39 is approximately proportional to the mass flow of air through the ramjet engine, assuming the sonic velocity is reached in the throat of the exhaust nozzle 8 and that the capture area of the air intake remains substantially the same, which will be the case with a fixed-geometry air intake if the flight Mach number varies only through a small range. Improved accuracy can be obtained by applying a correction which is a function of the temperature of the ambient air. The exhaust nozzle control system therefore operates in the following manner: the capsules 53 and 54 produce a force on the balance beam 55 which is proportional to the flow of fuel through the valve 16 to the engine, the force being, in the broad terms in which the invention has hereinbefore been defined, the "first signal which is a function of the supply of fuel to the engine." Similarly, the capsules 58 and 59 produce an opposing force on the balance beam 55 which is approximately proportional to the mass flow of air through the engine and is the previously mentioned "second signal which is a function of the mass flow of air through the engine." For a given setting of the adjustment needle 63 of the pressure potentiometer 60, the two forces acting on the balance beam 55 balance at a particular fuel-to-air ratio, and hold the flapper valve 64 stationary between the vent nozzles 65 and 66 so that the nozzle plug 9 remains in its set position. Supposing now that fuel flow to the engine is increased by the throttle valve 18 in response to a movement of the normal shock wave into the intake, known as a supercritical pressure recovery condition, the increased fuel flow will increase the pressure drop across the linear flow valve 16 and will cause the capsules 53 and 54 to exert an anti-clockwise moment on the balance beam 55 so that the flapper valve 64 obstructs the venting nozzle 65 more and the nozzle 66 less. The piston valve 70 accordingly moves upwards until the changes in area of the feed-back ports 73 and 74 equalise the pressures on the ends of the piston valve. At the same time, high pressure servo oil is admitted through the port 81 into the chamber 85 of the plug operating cylinder, and the chamber 84 is opened to discharge through the port 80. The piston 11 accordingly moves inwards and reduces the exhaust nozzle throat area. This has the effect of increasing the pressures within the ramjet engine so that the shock wave returns towards its required position 7, the error signal, i.e., the difference between the pressures in the chambers 31 and 32, diminishing and the throttle valve being reset until the flow of fuel is such as to maintain the shock wave at the position 7. Operation therefore restabilizes with a smaller exhaust nozzle throat area and the original fuel-to-air ratio. In the event of a change of condition tending to cause the normal shock wave to move out of the intake (sub-critical operation) the system will operate in a similar manner, with initial clockwise movement of the balance beam 55, and adjustment of the exhaust nozzle plug to a larger throat area setting, the fuel-to-air ratio again returning to its initial value.

Figure 4:
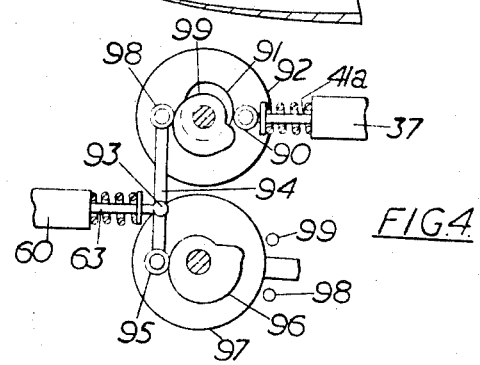
FIGURE 4 illustrates a detail in a control system responsive to flight Mach number and altitude.

Engine thrust can be controlled by adjusting the needle 63 of the pressure potentiometer 60. By decreasing the area of the downstream restrictor 62 the pressure in the capsule 59 is increased, and to rebalance the beam 55 the pressure difference $P_1-P_2$ between the capsules 53 and 54 must be reduced, i.e. the fuel flow must be reduced. The system therefore balances at a lower fuel-to-air ratio and the thrust is correspondingly reduced. Similarly, by increasing the area of the restrictor 62 the thrust may be increased. The balance condition can of course be varied in other ways than by varying the area of the restrictor 62, for example by changing the position of the pivot 56 or modifying the pressure in one of the other capsules, but generally speaking the first-mentioned method is the most convenient.

Where it is desired to stabilise the flight speed at a particular Mach number, the needle 63 may be adjusted by a device responsive to Mach number, in the sense that increasing Mach number reduces the area of the restrictor 62. Alternatively the needle may be adjusted by a device responsive both to flight Mach number and altitude, so that the flight Mach number varies with altitude according to a predetermined plan. An arrangement of this kind is illustrated in FIGURE 4. The needle 63 is connected to an intermediate point 93 in a lever 94 one end of which carries a cam follower 95 cooperating with a cam 96 rotated by an altimeter 97, while the other end of the lever is connected to a cam follower 98 cooperating with a cam 99 rotated by the Machmeter 92. A manual override for thrust control within a permissible range of the value determined by the flight plan may be provided, for example by allowing manual rotation of the altimeter 97 between stops 98 and 99.

Although a fixed-geometry air intake has been shown and described for the sake of simplicity, a variable-geometry type air intake controlled in response to flight Mach number will preferably be used, capable of maintaining an oblique shock wave system generated by the forward part of the centre body 3 in a suitable relation to the leading edge lip of the casing 1, for example so that the capture area remains approximately constant.

Figure 2:
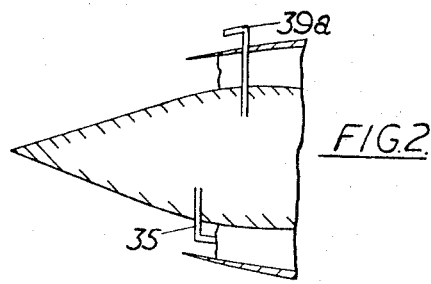
FIGURES 2 and 3 show different arrangements for obtaining control signals representative of airflow conditions.
Figure 3:
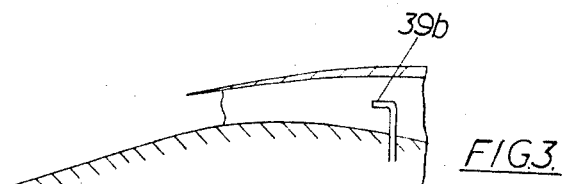

Depending on the actual design used, it may be necessary, in order to obtain an air pressure signal sufficiently representative of mass flow of air through the engine, to modify the impact pressure $P_R$ sensed by the nose probe sensing head 39 as a function of flight Mach number. Such modification may be effected by suitably coupling the adjuster 63 of the pressure potentiometer 60 to a Machmeter. This adjustment may be incorporated in the cam 99 of the flight plan system shown in FIGURE 4. Alternatively it is frequently possible to obtain a suitable reference pressure by placing the impact pressure sensing head 39 in a selected position, for example on the outside of the engine cowl as shown at 39a in FIGURE 2, or in the subsonic airflow stream behind the normal shock wave as shown at 39b in FIGURE 3. A further known alternative is to sense impact pressure behind a normal shock wave in a small "dummy" duct arranged alongside the engine, with suitable intake geometry but no combustion system.

A signal which is a function of the supply of fuel to the engine may be obtained in various alternative ways, for example from the displacement of a valve member, such as that in the valve 16, which is proportional to the flow of fuel, or from the displacement of the throttle valve member 18, means being provided for keeping the pressure drop across the valve constant and the port area being proportional to the displacement.

Figure 5:
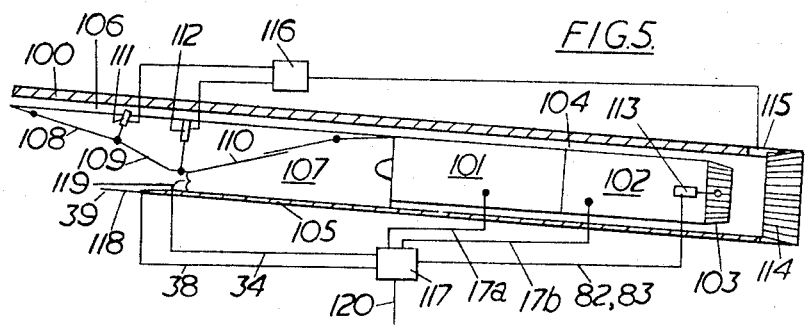
FIGURE 5 illustrates diagrammatically the application of the invention to a power plant incorporating a turbojet engine.

FIGURE 5 shows a power plant mounted below a wing 100 of an aircraft for flight at supersonic speeds. The power plant comprises a turbojet engine 101 with an afterburner 102 and an adjustable primary nozzle 103 mounted in a duct 104 defined between the wing and a lower boundary wall 105. In front of the engine is a variable-geometry air intake comprising a boundary layer passage 106 adjacent to the wing 100 and an engine air passage 107, the latter being defined between the wall 105 and a system of ramps 108, 109, 110, the positions of which are adjustable by actuators 111 and 112. The primary nozzle 103, which is adjustable by an actuator 113, and the boundary layer air passage 106 discharge into the duct 104 which terminates in a variable area secondary nozzle 114 having an actuator 115.

The actuators 111 and 112 of the intake and 115 of the second nozzle are controlled in response to flight Mach number by a Machmeter 116, the arrangement being indicated for convenience in block diagram style. Similarly, a critical intake control, a fuel:air ratio control, and a primary nozzle throat area control operating in the manner explained with reference to FIGURE 1, are all shown as a block diagram, the diagram including a box 117 containing the valves and computing mechanism. The airflow reference pressure $P_R$ is sensed by an impact head 39 on a probe 118 projecting forwardly of the leading edge of the wall 105 and is fed into the computer 117 through a line 38, while a reversed Pitot head 119 connected to the computer by a line 34 is arranged at the throat of the engine air passage 107 to sense the pressure rise at the normal shock wave in critical intake operation. The primary nozzle actuator 113 is supplied with working fluid through a line 82, 83. Fuel is supplied to the turbojet engine 101 and afterburner 102 through lines 17a and 17b.

If it is intended that the afterburner should be used only for transonic acceleration and/or subsonic flight, its fuel:air ratio may be maintained at a selected constant or progressively varied value, critical intake operation being maintained during supersonic flight solely by control of the fuel:air ratio of the turbojet engine. On the other hand, if it is intended to maintain the afterburner in constant operation during supersonic flight, the control may be applied to the fuel:air ratio of the afterburner, or the fuel:air ratios of both the turbojet engine and the afterburner may be varied in a suitably coordinated manner within the overall requirement of maintaining critical intake operation. Line 120 represents an input for manual thrust variation.

I claim:
1. An aircraft engine for flight at supersonic speeds, comprising an air intake passage with a throat, a subsonic combustion zone, means for supplying fluid fuel to the combustion zone, and an exhaust nozzle with adjustable throat area; and including a control system comprising:
    (a) fuel flow control means responsive to the position of a normal shock wave in the air intake so as to tend to return the shock wave to a predetermined position on departure therefrom,
    (b) means for producing a first signal which is a function of the supply of fuel to the engine,
    (c) means for producing a second signal which is a function of the mass flow of air through the engine,
    (d) exhaust nozzle throat area varying means responsive to the ratio of the first and second signals to reduce nozzle throat area on increase of said ratio from a predetermined value, and vice versa, and
    (e) means constituting a thrust selector, for modifying one or both of the said signals, or the response of the nozzle throat area varying means to their ratio.

2. An engine according to claim 1 in which means (a) includes a fuel flow control valve, operating means therefor, a reversed Pitot system sensing pressure in the intake passage at the predetermined position, an impact pressure head sensing impact pressure of the external or internal air stream at another position, a pressure potentiometer, means connecting the pressure potentiometer to receive air from the impact pressure sensing head, and to discharge air to atmosphere through a choked nozzle, and means acting on the operating means and responsive to the difference between the pressure sensed by the reversed Pitot system and the pressure at an intermediate tapping of the pressure potentiometer.

3. An engine according to claim 2, in which the area of the choked nozzle is adjustable.

4. An engine according to claim 1, in which means (b) consist of a valve having a linear pressure-flow characteristic and interposed in the fuel supply line, and means for producing a force (the first signal) which is proportional to the difference between the fuel pressures upstream and downstream of this valve.

5. An engine according to claim 1, in which means (c) consist of an impact pressure head sensing impact pressure of the external or internal air stream, a pressure potentiometer, means connecting the pressure potentiometer to receive air from the impact pressure head through a restriction upstream of an intermediate tapping and to discharge air to atmosphere through a downstream restriction, and means for producing a force (the second signal) which is proportional to the difference between the pressure sensed by the impact pressure head and the pressure at the intermediate tapping of the pressure potentiometer.

6. An engine according to claim 5, in which means (e) consists of means for adjusting the downstream restriction of the said pressure potentiometer.

References Cited by the Examiner
UNITED STATES PATENTS

| | | | |
|---|---|---|---|
| 2,956,398 | 10/1960 | Muhlfelder | 60—35.6 |
| 3,078,658 | 2/1963 | Sargent | 60—35.6 |

JULIUS E. WEST, *Primary Examiner.*